April 14, 1959 R. E. SPENCER 2,882,524
APPARATUS FOR SENSING THE POSITION OF A MOVABLE ELEMENT
Filed Jan. 29, 1951 2 Sheets-Sheet 1
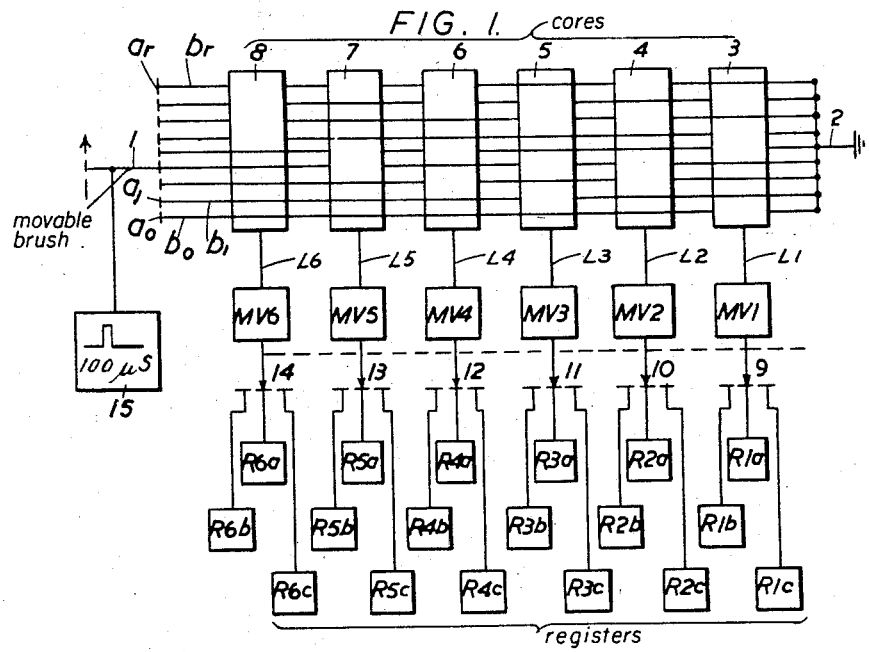
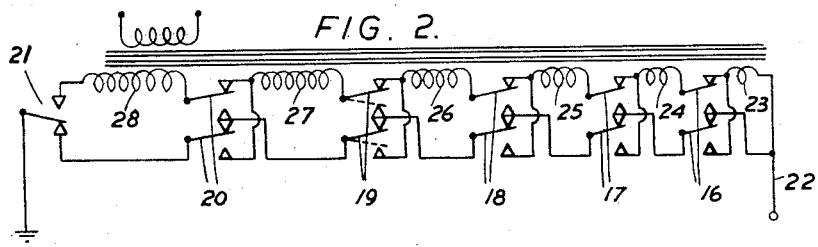
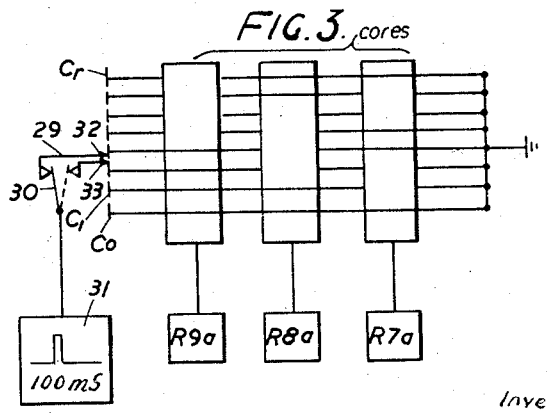
Inventor
ROLF EDMUND SPENCER
By Ralph E. Atherton
Attorney

United States Patent Office 2,882,524
Patented Apr. 14, 1959

2,882,524

APPARATUS FOR SENSING THE POSITION OF A MOVABLE ELEMENT

Rolf Edmund Spencer, Ealing, London, England, assignor to Electric & Musical Industries Limited, Hayes, Middlesex, England, a company of Great Britain Application January 29, 1951, Serial No. 208,297

Claims priority, application Great Britain January 31, 1950

5 Claims. (Cl. 340—347)

This invention relates to apparatus for sensing the position of a movable element.

In computing apparatus it is frequently desired to sense the instantaneous position of a movable element, for instance so that an indication of position may be stored and compared with other indications with the object of predicting future positions of the element. It has been proposed to effect the instantaneous determination by recording the angular displacement of a shaft whose rotation is representative of the movement of the element, but the difficulty is encountered in determining the displacement without interfering with the motion of the shaft and in such a way that the result can be stored in a form, e.g. as an electrical voltage, suitable for future use.

The object of the present invention is to reduce this difficulty.

With this object in view, the present invention provides apparatus for sensing the position of a movable element, the apparatus comprising a selector movable to represent said element, a series of fixed switch means arranged to be scanned by said selector, a plurality of indicator means, means coupling said switch means respectively to said indicator means, each switch means being coupled to a different combination of said indicator means, and means for applying a sensing signal to said selector to be picked up by one of said switch means and applied to the corresponding combination of indicator means in dependence upon the position of said selector.

In order that the said invention may be clearly understood and readily carried into effect, the same will now be more fully described with reference to the accompanying drawings in which:

Figure 1 illustrates in block form one application of the present invention,

Figure 2 illustrates a detail of part of Figure 1, and

Figure 3 illustrates a further feature which may be embodied in apparatus such as Figure 1.

Figure 4:
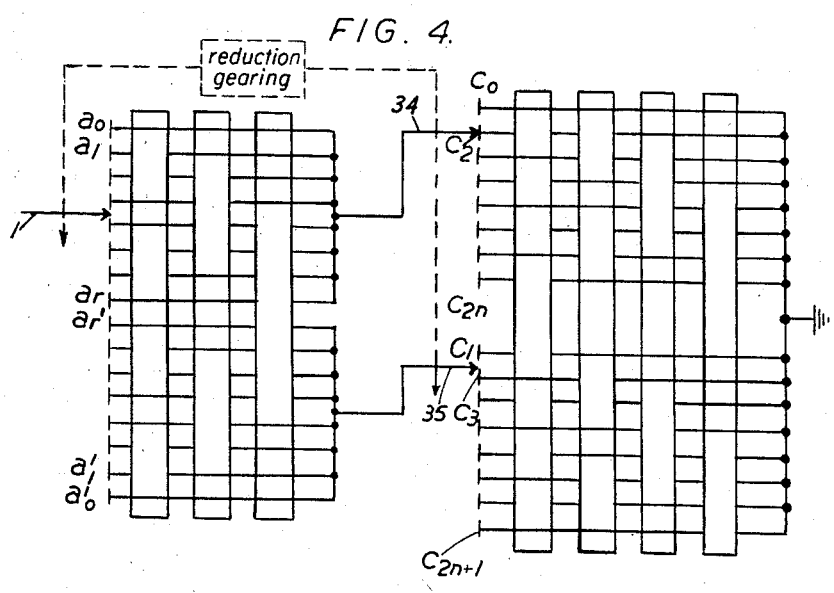
Figure 4 illustrates a modification of Figure 3.

Referring to the drawing, numeral 1 indicates a selector in the form of a contact brush which is driven by a shaft, not shown, displaceable in dependence upon the element whose position has to be recorded. A plurality of closely adjacent contact studs $a_0, a_1 \ldots a_r$ are arranged in succession in the path of the brush 1 and a separate conductor $b_0, b_1 \ldots b_r$ is connected between each stud $a_0, a_1 \ldots a_r$ and an earth point 2. The studs constitute elements of a multiposition switch and the brush 1 selectively co-operates with these elements in dependence upon the magnitude to be recorded. The blocks 3, 4 . . . 8 represent toroidal magnetic cores each having a winding applied thereto, the core windings being coupled successively to triggered devices MV1 . . . MV6 having one stable state and one unstable state. A trigger circuit suitable for use as the elements MV1 . . . MV6 is described with reference to Figure 4.9, page 176, of "Ultra-High-Frequency Techniques" by Brainerd at al., published by D. Van Nostrand Company Inc. The windings which couple the respective cores 3 . . . 8 to the triggered devices MV1 . . . MV6 are represented in the drawings by the lines L1 . . . L6. The cores are shown in the drawing as having their axes parallel to the plane of the drawing and it is convenient to regard them as transformer cores, the windings L1 . . . L6 being the secondary windings of these transformers. The conductors $b_1 \ldots b_r$ pass either through the cores or outside the cores and where a conductor passes through a core it can be regarded as a single turn primary winding on the corresponding transformer whereby there is a coupling, via the magnetizable core, and the respective one of the windings L1 . . . L6 to the respective one of the triggered devices MV1 . . . MV6. It is convenient to regard the cores as representing different numbers on a binary scale of notation, the cores 3 . . . 8 corresponding to digits of successively higher power. The scale of notation employed is not the conventional binary scale but is a scale which will be referred to subsequently. If the number represented by a particular conductor has the value 1 for a digit of the power corresponding to one of the cores 3 . . . 8, the conductor is laced through that core. If the said digit has the value 0, the conductor is passed outside the core. Only a limited number of conductors are shown in Figure 1, representing successively greater numbers but not consecutive numbers, but it is to be understood that in practice the number of conductors ordinarily employed will be equal to the largest number which can be expressed using the number of binary digits represented by the cores 3 . . . 8. The conductors, moreover, will be arranged in order according to the numbers represented. Each conductor is thus coupled with a different combination of the devices MV1 . . . MV6 indicative, in the aforesaid binary scale, of the position of the corresponding contact in the array of contacts $a_0 \ldots a_r$. The triggered devices form intermediate coupling means between the cores and banks of relays R1a . . . R6a, R1b . . . R6b, R1c . . . R6c as shown, selector switches 9 . . . 14 being provided so that the banks of relays can be brought into operation one at a time. Reference number 15 indicates a device from which sensing pulses of short duration, say 100 μs, can be applied to the brush 1.

If a sensing pulse is applied to the brush 1, in any position of the shaft, it is transmitted along the conductor connected to stud ($a_1 \ldots a_r$) momentarily engaged by the brush 1. The pulse is therefore transmitted to the triggered device associated with each core through which the last mentioned conductor is laced, so that the corresponding triggered devices are stimulated and caused to change to their unstable states. The resultant pattern of the states of the triggered devices is therefore a binary representation of the position of the shaft. Each relay has "hold" contacts, and each triggered device has a time constant circuit such that on the device being changed to its unstable state, it remains therein for a sufficient time to change the state of the corresponding relay from an initial state, which may be termed the "zero" state to another state which may be termed state "one" and to ensure safe looking-in of the relays. A record of the brush position is therefore "frozen" in one bank of relays, e.g. R1a to R6a which therefore constitute a plurality of indicator means whose combined indications are representative of the brush position, at the instant of the pulse. As the triggered devices are no longer performing a function on returning to their stable states they are free to act as intermediaries in "freezing" a record of a new position in the second bank of relays, R1b to R6b, and even for operating in the same way on a different shaft representing a different quantity.

The relay contacts are arranged to synthesize a voltage which is representative of the position of the shaft so that the indication can be stored until required. To this end, as will appear from the description relative to Figure 2, the relay contacts are arranged to control the number of turns in a transformer winding in such manner that, in response to a single pulse, an alternating current voltage can be derived from said winding which is the voltage analogue of the position of the shaft at the time of occurrence of the sensing pulse.

A practical difficulty arises due to the fact that there is a liability for the brush 1 to short-circuit two of the contacts $a_0 \ldots a_r$ at once. This difficulty is resolved in the arrangement illustrated by using as aforesaid a modified binary scale of notation in which only one digit changes at a time, as follows:

| Decimal number: | Binary number |
| --- | --- |
| 1 | 1 |
| 2 | 11 |
| 3 | 10 |
| 4 | 110 |
| 5 | 111 |
| 6 | 101 |
| 7 | 100 |

And so on.

The conductors $b_0 \ldots b_r$ are laced accordingly, and then only one relay can be in any doubt: it must fall one way or the other, and the difference only represents one digit of lowest power. The record of the position is restored to a conventional number by employing a synthesizing device such as shown in Figure 2. This comprises sets of switches 16 . . . 21 which are operated by the relays R1 to R6 respectively. The switches control a conductive path between ground and an output terminal 22, into which may be switched successive sections 23 . . . 28 of a transformer secondary winding. The primary winding of the transformer is not shown. The sections 23 . . . 28 are such that the electromotive force induced across any section is twice the electromotive force induced across the next succeeding section in the series so that the electromotive forces set up across the sections are related to one another as successive powers of two. It is arranged that the switches 16 . . . 21 are normally in the positions indicated by full lines when the corresponding relays are in their zero states. However, if any relay, say the relay R4 is changed to state "one" the corresponding switch 19 is changed to the condition indicated by the dotted lines. All the sections 23 . . . 26 are then connected between the terminal 22 and ground and the output voltage which can be derived from between the terminal 22 and ground is the voltage analogue of the position of the contact brush. In the positions of the switches indicated by full lines all the sections 23 . . . 28 are by-passed and no voltage is set up at the terminal 22. However, it will be observed that if the condition of any of the switches 16 . . . 21 is changed, the connections of each section 23 . . . 28 of lower digital power are automatically reversed, and any section of lower digital power which would otherwise be by-passed is switched between the terminal 22 and earth, while any section of lower digital power which would otherwise be switched between 22 and earth becomes by-passed. As a result the voltage set up at the terminal 22 is the voltage analogue of the number expressed in the aforesaid modified binary scale by the relays. The transformer secondary windings 23 to 28 can be regarded as voltage sources for setting up a series of voltages, one for each of the triggered devices MV1 to MV6, the voltage source being arranged to set up voltages which are related as successive integral powers of two.

The device shown in Figure 1 may be employed for interpolating between values recorded by a relatively slow moving brush. This is illustrated in Figure 3 wherein numeral 29 indicates the slow moving brush, which is adapted to move along a path including successive contact studs $c_0, c_1 \ldots c_r$ the brush 1 being then arranged to scan the studs $a_0, a_1 \ldots a_r$ during the interval required for the brush 29 to move between the centres of successive studs $c_0, c_1 \ldots c_r$. With this arrangement there is, however, the difficulty that while the brush 29 is changing from one stud $c$ to another, there may momentarily be uncertainty as to whether the value recorded by the device of Figure 1 is appropriate to the first or the second of the studs. This difficulty is resolved by making use of the state of the highest order relay in Figure 1, to control a switch 30 in the lead from a pulse source 31 to the brush 29, the brush having leading and lagging contacts 32 and 33. As the slow-speed brushes are fairly slow moving, it may be suitable, as indicated in Figure 3, to operate recording relays R7a, R8a and R9a directly instead of through triggered devices as in Figure 1, the tolerance on the leading and lagging contacts 32 and 33 ensuring adequate time for operation.

If desired spare contacts on the relays may be caused to operate punches for the purpose of making a permanent record on card or tape of the behaviour of an instrument, either in testing or in operation, without needing any mechanical modification to the equipment.

As an alternative to the arrangement of Figure 3, when it is desired to use the arrangement of Figure 1 to interpolate between the values of a slow moving brush, the arrangement of Figure 4 may be used. In this arrangement the pulse applied to higher speed brush 1 is also applied selectively to the brushes 34 and 35 of two position sensing devices for giving an approximate indication of the shaft position, the brushes 34 and 35 together covering a greater range of positions than the contact brush 1. Thus, the studs $c_0, c_1 \ldots c_{2n+1}$ each covers an interval in the full range of positions of the element whose position is to be sensed, the first interval being represented by the stud $c_0$, the second interval being represented by the stud $c_2$, and so on. The brushes 34 and 35 are mechanically coupled as indicated by the vertical dotted line and, as will hereinafter appear, the brush 1 senses the exact position of the movable element within the interval represented by the particular one of the studs $c_0 \ldots c_{2n+1}$ engaged at the instant of sensing by the brush 34 or the brush 35. All the toroidal cores (indicated by rectangles as in Figures 1 and 3) are connected via triggered devices to relays as in Figure 1. The triggered devices and relays are, however, omitted in Figure 4. The slow speed brush 34 co-operates with even numbered studs $c_0, c_2 \ldots$ while the slow speed brush 35 cooperates with odd numbered studs $c_1, c_3 \ldots$ and each slow speed brush is of the break before make variety and is arranged so that when the brush 34 (say) is in the centre of an even numbered stud, the brush 35 is mid-way between two odd-numbered contacts. There is, furthermore, an appreciable period when both brushes 34 and 35 are making contact with studs of their respective groups. The studs which co-operate with the high speed brush 1 are arranged in a circle, although for convenience they are shown in a straight line in the drawing and are divided into two equal groups $a_0, a_1 \ldots a_r$ and $a_r', a_{r-1}' \ldots a_0'$. The conductors from the two groups are connected respectively to slow speed brushes 34 and 35 as shown. The relationship of the high and slow speed brushes is arranged to be such that when a slow speed brush is in the centre of a stud the high speed brush 1 is in the centre of the corresponding group of its own studs. Furthermore, the high speed brush 1 is arranged to make one-half revolution for every stud traversed by the brush of each of the slow speed switches. It will now be seen that when both slow speed brushes are making contact with studs of their respective switches and a pulse is applied to the high speed brush at an instant when it is desired to determine the position of the slow speed brushes, only one of them will receive the pulse from the high speed switch and thus electrically the change-over of studs on the slow speed switch is determined by the high speed switch and the risk of ambiguity is removed.

What I claim is:

1. Apparatus responsive to the position of a movable element, comprising a selector movable to represent said element, a series of switch elements arranged to be scanned by said selector, a conductor leading from each switch element, a group of magnetizable cores each of closed configuration, each of said conductors being laced through a different selection of said cores, an indicator device electromagnetically coupled to each of said cores, and means for applying a sensing pulse to said selector, whereby said pulse is propagated to the switch element representative of the instantaneous position of said selector and thence to the corresponding selection of said indicator devices.

2. Apparatus responsive to the position of a movable element, comprising a selector movable to represent said element, a series of fixed contacts arranged to be scanned by said selector, a conductor leading from each fixed contact, a group of magnetizable cores each of closed configuration, each of said conductors being laced through a different selection of said cores, a trigger device electromagnetically coupled to each of said cores, a group of inductors, switches responsive to said trigger devices for connecting different selections of said inductors in series, means for energizing said inductors with alternating current energy, and means for applying a sensing pulse to the selector to determine the position of said selector whereby said pulse is propagated to such a selection of said trigger devices that a signal can be derived from said inductors representative of the instantaneous position of said selector.

3. Apparatus responsive to the position of a movable element, comprising a selector movable to represent said element, a series of switch elements arranged to be scanned by said selector, a conductor leading from each switch element, a group of magnetizable cores, each of said conductors being electromagnetically linked with a different selection of said cores, an indicator device electromagnetically coupled to each of said cores, and means for applying a sensing pulse to said selector, whereby said pulse is propagated to the switch element representative of the instantaneous position of said selector and thence to the corresponding selection of said indicator devices.

4. Apparatus responsive to the position of a movable element, comprising a selector movable to represent said element, a series of switch elements arranged to be scanned by said selector, a group of trigger devices, means coupling each of said switch elements to a different combination of said trigger devices, a group of voltage sources for setting up a series of different voltages, one for each trigger device, switches responsive to said trigger devices for connecting different combinations of said voltage sources in series, and means for applying a sensing pulse to the selector to determine the position of said selector, the sensing pulse causing such a combination of said voltage sources to be connected in series that the resultant voltage represents the position of said selector at the time of the sensing pulse.

5. Apparatus responsive to the position of a movable element, comprising a selector movable to represent said element, a series of switch elements arranged to be scanned by said selector, a conductor connected from each switch element to a point of reference potential, a group of magnetizable cores of closed configuration, each of said conductors being laced through a different selection of said cores, a group of output circuits one for each core and electromagnetically coupled to the respective cores, means connected from said selector to said point of reference potential for applying a sensing signal to said selector and thence to a selection of said output circuits depending upon the position of said selector.

References Cited in the file of this patent

UNITED STATES PATENTS

| | | |
|---|---|---|
| 1,897,047 | Grace | Feb. 14, 1933 |
| 2,023,221 | Fischer | Dec. 3, 1935 |
| 2,207,743 | Larson et al. | July 16, 1940 |
| 2,397,604 | Hartley et al. | Apr. 2, 1946 |
| 2,496,585 | Harper | Feb. 7, 1950 |
| 2,502,837 | Entz | Apr. 4, 1950 |
| 2,525,893 | Gleess | Oct. 17, 1950 |
| 2,564,403 | May | Aug. 14, 1951 |
| 2,575,342 | Gridley | Nov. 20, 1951 |
| 2,597,866 | Gridley | May 27, 1952 |
| 2,630,552 | Johnson | Mar. 3, 1953 |
| 2,630,562 | Johnson | Mar. 3, 1953 |
| 2,658,139 | Abate | Nov. 3, 1953 |